(12) United States Patent
Utsugi et al.

(10) Patent No.: US 9,415,687 B2
(45) Date of Patent: Aug. 16, 2016

(54) RECONFIGURABLE DASHBOARD ASSEMBLY FOR MILITARY VEHICLES

(71) Applicant: Korry Electronics Co., Everett, WA (US)

(72) Inventors: Michael Y. Utsugi, Seattle, WA (US); Shawn M. Doyea, Seattle, WA (US); Ryan Mitchell, Bothell, WA (US)

(73) Assignee: Korry Electronics Co., Everett, WA (US)

( * ) Notice: Subject to any disclaimer, the term of this patent is extended or adjusted under 35 U.S.C. 154(b) by 0 days.

(21) Appl. No.: 14/629,306

(22) Filed: Feb. 23, 2015

(65) Prior Publication Data

US 2015/0266381 A1   Sep. 24, 2015

Related U.S. Application Data

(63) Continuation of application No. 13/957,405, filed on Aug. 1, 2013, now Pat. No. 8,960,760, which is a continuation of application No. 12/938,257, filed on Nov. 2, 2010, now abandoned, which is a continuation of application No. 12/246,462, filed on Oct. 6, 2008, now Pat. No. 7,823,952.

(51) Int. Cl.
| | |
|---|---|
| *B62D 25/14* | (2006.01) |
| *B60K 37/02* | (2006.01) |
| *B60K 35/00* | (2006.01) |
| *B60K 37/00* | (2006.01) |
| *B60K 37/06* | (2006.01) |
| *B60R 7/06* | (2006.01) |
| *G07C 5/12* | (2006.01) |

(52) U.S. Cl.
CPC .............. *B60K 37/02* (2013.01); *B60K 35/00* (2013.01); *B60K 37/00* (2013.01); *B60K 37/06* (2013.01); *B60R 7/06* (2013.01); *B60K 2350/1024* (2013.01); *B60K 2350/1028* (2013.01); *G07C 5/12* (2013.01); *Y10T 29/49826* (2015.01); *Y10T 29/49904* (2015.01)

(58) Field of Classification Search
CPC ........ B60K 35/00; B60K 37/02; B60K 37/00; B60K 37/06; B60R 11/02; B60R 21/205
USPC ..................................... 296/70, 192; 180/90
See application file for complete search history.

(56) References Cited

U.S. PATENT DOCUMENTS

| | | | | | |
|---|---|---|---|---|---|
| D82,501 | S | * | 11/1930 | Henderson ................... | D12/192 |
| D100,173 | S | * | 6/1936 | Mayer .......................... | D12/192 |
| D156,455 | S | * | 12/1949 | Patten ........................... | D12/192 |
| D209,957 | S | * | 1/1968 | Lathers ......................... | D12/192 |
| 4,453,759 | A | * | 6/1984 | Kathiria ................. | B60N 3/102 108/44 |
| 4,594,764 | A | * | 6/1986 | Yamamoto ............. | B62D 65/14 198/339.1 |
| 4,876,786 | A | * | 10/1989 | Yamamoto ............. | B62D 65/14 29/281.4 |
| 4,896,373 | A | * | 1/1990 | Blake ..................... | A47B 83/04 446/7 |
| 5,005,898 | A | * | 4/1991 | Benedetto ............. | B60R 13/083 296/191 |
| 5,174,621 | A | * | 12/1992 | Anderson ............. | B60K 37/02 180/90 |
| D336,459 | S | * | 6/1993 | Tisten .......................... | D12/192 |
| D378,585 | S | * | 3/1997 | Duguid ........................ | D12/192 |
| 5,743,585 | A | * | 4/1998 | Pranger .................... | B60N 3/08 224/275 |

(Continued)

*Primary Examiner* — Kiran B Patel
(74) *Attorney, Agent, or Firm* — Perkins Coie LLP

(57) ABSTRACT

A modular dashboard assembly for a vehicle, such as a tactical vehicle, is described. In some cases, the dashboard assembly includes a smart back plane and removably attachable front modules. The back plane may facilitate communications between components within the front modules and systems with the vehicle, or between components.

19 Claims, 12 Drawing Sheets

(56) References Cited

U.S. PATENT DOCUMENTS

| | | | |
|---|---|---|---|
| D395,030 S * | 6/1998 | Hellhake | D12/192 |
| 5,761,995 A * | 6/1998 | Laiserin | G09F 3/00 |
| | | | 101/32 |
| 5,797,620 A * | 8/1998 | Eyrainer | B60R 21/206 |
| | | | 280/730.1 |
| D397,977 S * | 9/1998 | Hellhake | D12/192 |
| D423,434 S * | 4/2000 | Yano | D12/192 |
| 6,045,444 A * | 4/2000 | Zima | B60H 1/00028 |
| | | | 165/103 |
| 6,092,836 A * | 7/2000 | Saslecov | B60R 21/045 |
| | | | 280/730.1 |
| 6,119,060 A * | 9/2000 | Takayama | B60K 35/00 |
| | | | 307/9.1 |
| D440,924 S * | 4/2001 | Bartholomai | D12/192 |
| 6,351,962 B1 * | 3/2002 | Mizutani | B60H 1/00528 |
| | | | 180/90 |
| 6,464,281 B2 * | 10/2002 | Volkmann | B60K 37/00 |
| | | | 224/926 |
| D480,029 S * | 9/2003 | Kraus | D12/192 |
| 6,631,920 B1 * | 10/2003 | Webber | B60R 21/206 |
| | | | 280/730.1 |
| D489,301 S * | 5/2004 | Okonkwo | D12/192 |
| 6,756,004 B2 * | 6/2004 | Davis, Jr. | B29C 45/1635 |
| | | | 264/255 |
| 7,201,434 B1 * | 4/2007 | Michalak | B60R 37/00 |
| | | | 280/752 |
| 7,425,891 B2 * | 9/2008 | Colburn | B60K 35/00 |
| | | | 340/438 |

* cited by examiner

RECONFIGURABLE DASHBOARD ASSEMBLY FOR MILITARY VEHICLES

CROSS-REFERENCE TO RELATED APPLICATIONS

This application is a continuation of U.S. patent application Ser. No. 13/957,405, filed Aug. 1, 2013 and titled RECONFIGURABLE DASHBOARD ASSEMBLY FOR MILITARY VEHICLES, which is a continuation of of U.S. patent application Ser. No. 12/938,257, filed Nov. 2, 2010 and titled RECONFIGURABLE DASHBOARD ASSEMBLY FOR MILITARY VEHICLES, which is a continuation of U.S. patent application Ser. No. 12/246,462, filed Oct. 6, 2008 and titled RECONFIGURABLE DASHBOARD ASSEMBLY FOR MILITARY VEHICLES, all of which are incorporated herein by reference in their entirety.

TECHNICAL FIELD

The present disclosure relates to interior components for vehicles, including dashboards and consoles for military vehicles.

BACKGROUND

A conventional dashboard assembly typically includes an integral control panel located under the windshield of a vehicle. The dashboard assembly may contain instrumentation and controls associated with the operation, functionality, and/or monitoring of the vehicle. For example, a dashboard includes multiple gauges (such as speedometers, tachometers, odometers, and/or fuel gauges), indicators (such as gear shift position, seat belt warning lights, and/or engine malfunction lights), and other instruments. A dashboard may also include heating or ventilation controls, vents, lighting controls, audio equipment, navigation systems, storage compartments (e.g., glove compartments), consoles, and other features.

Generally, these instruments, indicators and other components are located in various fixed positions on a single dashboard panel. For example, the gauges and indicators may be at a driver's side of the dashboard, the audio equipment may be centrally located, and the storage compartment may be at a passenger's side of the dashboard.

Tactical vehicles, such as vehicles that operate military missions, generally include additional components within their dashboards. The components may be mission specific components, providing drivers and passengers with information and functionalities necessary for the mission. These components may include C4I (Command, Control, Communications, Computers, and Intelligence) equipment, display components, human machine interface equipment, storage equipment, auxiliary power equipment, communications equipment, weapon control, navigation, situational awareness information, and other controls and/or information systems.

These types of vehicles are often used for different mission variants, such as command missions, supply missions, control missions, reconnaissance mission, intelligence gathering missions and medivac missions. Once the vehicles are built and configured in a factory, it can be difficult to reconfigure them to satisfy the needs of a certain mission variant. A tactical vehicle may often be called upon to perform different variants within a short period of time. However, conventional vehicles cannot be easily modified, and unnecessary equipment may clutter or hinder efficient operation in a vehicle during a mission. Also, repairing or servicing equipment in the dashboard can be difficult due to the relative rigid structure of single dashboard panels. In addition, upgrading equipment can also be challenging, because the new equipment may require adjustments to the dashboard configuration, such as the placement and/or location of HVAC routing, equipment cutouts, wiring, and so on. These and other drawbacks exist with respect to traditional, single panel, dashboards in vehicles.

DETAILED DESCRIPTION

Overview

Figure 1A:
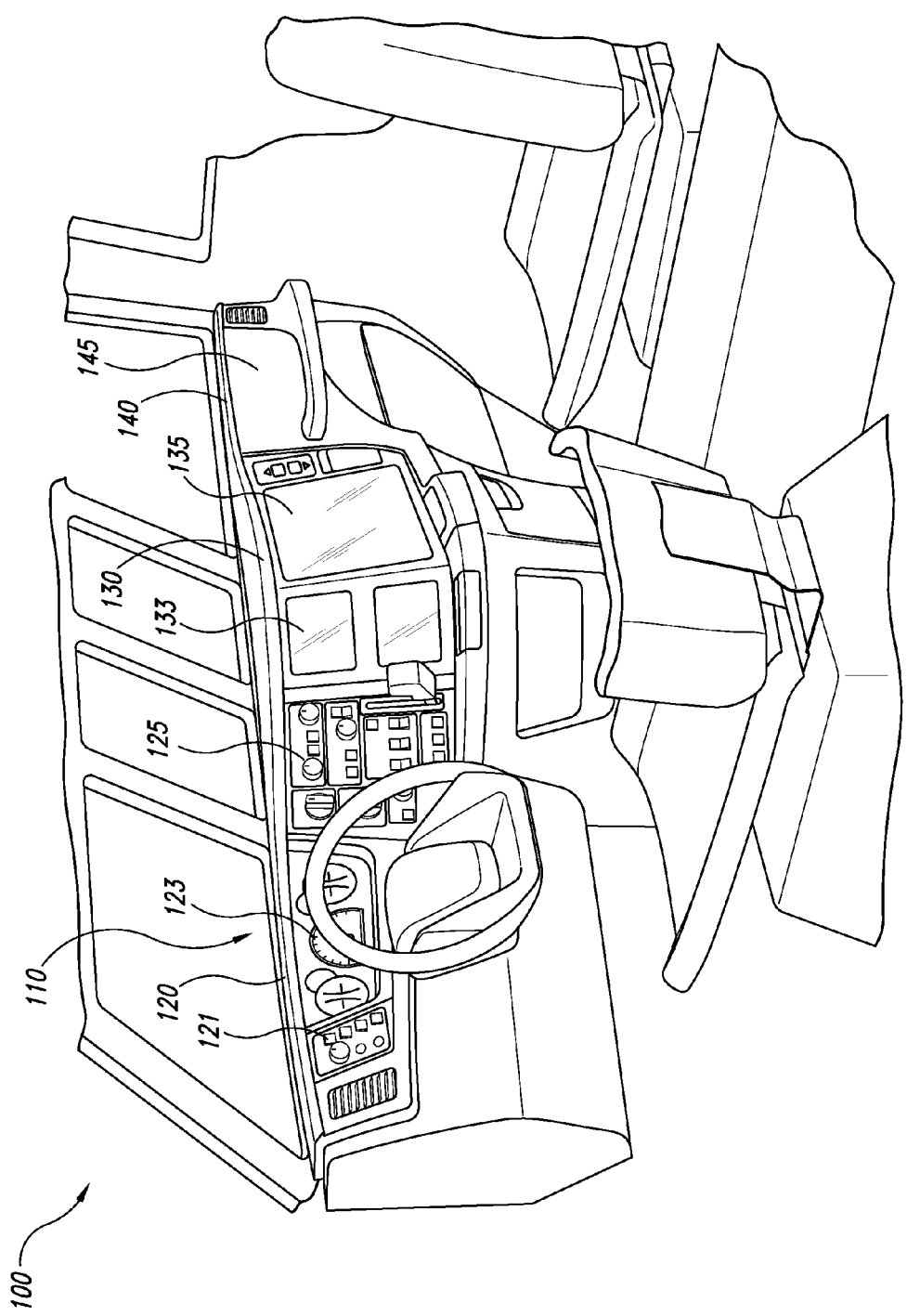
FIG. 1A is a schematic isometric view of a dashboard assembly within a vehicle in accordance with an embodiment of the present invention.

Described in detail herein is a mission adaptable control system having a modular dashboard assembly for use in vehicles, such as tactical vehicles. In some examples, the dashboard assembly includes a back support structure, such as a back plane attached to the vehicle's chassis or frame. Additional control modules, such as driver modules, center modules, and/or passenger modules, are removably coupled to the back plane to form the dashboard assembly.

In some cases, some of the control modules are specifically configured with mission variant capabilities or controls, and the modules can be easily and quickly removed and replaced by other modules with the same or other configurations depending upon the mission requirements or other needs of the vehicle. For example, before deploying the vehicle on a mission, a passenger module configured for a prior different mission is quickly and easily removed from the back panel, and replaced by a new passenger module better suited for the current mission. A driver module and/or center module may also be removed from the back panel and replaced with another module as needed for a particular mission or intended use of the vehicle.

In some cases, the back plane contains and/or consolidates electrical wiring and other equipment necessary for interfacing between the dashboard assembly and the vehicle, such as the HVAC system, computerized control systems, power systems, data busses and other communication systems, and so on. In these cases, the back plane is a smart back panel configured with module reception parts shaped and sized to removeably receive and securely retain the selected control modules. The reception parts may provide electrical and data connections that facilitate electrical and data communications between the back panel and the control modules. The reception parts may also provide connections for cooling systems for the electrical and data communication systems, such as high powered display modules and associated equipment. By providing the smart back panel that contains and integrates the electrical, data, and other underlying equipment for the interface between the control modules and the other vehicle systems, the modular dashboard assembly facilitates modifying and reconfiguring the dashboard without reconfiguring the underlying infrastructure of the dashboard assembly. The smart back panel can also be configured with electrical, communication, and/or data related systems that facilitate sensor fusion between the features of the modules and/or the mission-specific components in the vehicle controlled at least in part by features, such as control heads, on the front modules.

The system and dashboard assembly will now be described with respect to various examples. The following description provides specific details for a thorough understanding of, and enabling description for, these examples of the system. However, one skilled in the art will understand that the system may be practiced without these details. In other instances, well-known structures and functions have not been shown or described in detail to avoid unnecessarily obscuring the description of the examples of the system.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1A, a schematic isometric view of a suitable dashboard assembly within a vehicle is shown. A vehicle 100 includes a modular dashboard assembly 110. The modular dashboard assembly 110 includes three front modules (modules viewable and accessible to users of the vehicle). The front modules may be a driver module 120, a center module 130, and a passenger module 140. The driver module 120 may include various integrated components, such as gauges 123 and controls 125. The center module 130 may include various components, such as various display and/or control components 133, 135. The passenger module 140 may include various components, such as communication components, command center components, displays, switches, controls, and/or storage component 145. Of course, the front modules may include other components not shown in the Figure.

Figure 1B:
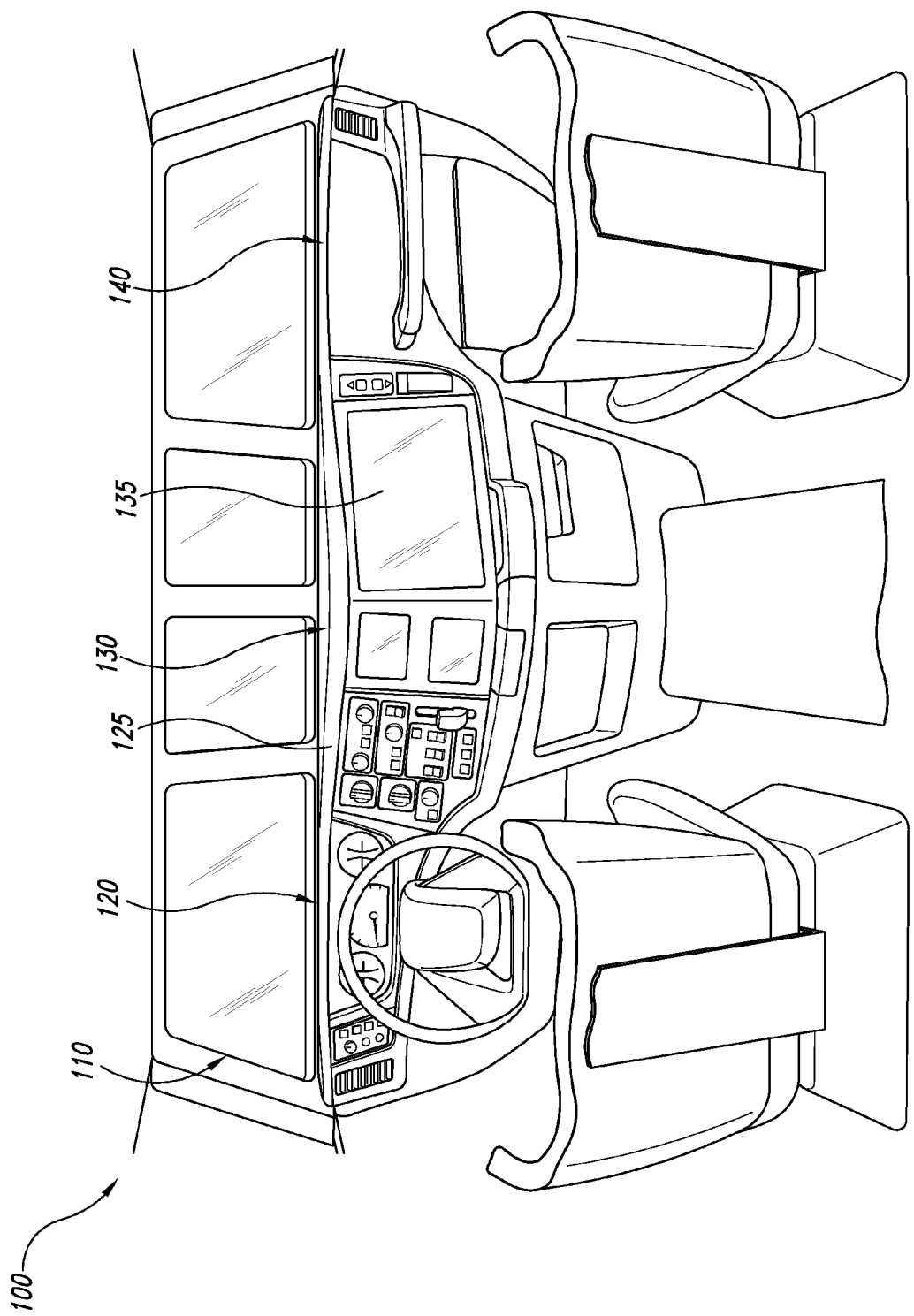
FIG. 1B is a schematic front perspective view of the dashboard assembly of FIG. 1A within a vehicle.

Referring to FIG. 1B, a schematic perspective view of a suitable dashboard assembly within a vehicle is shown. The illustrated dashboard assembly 110 shows the driver module 120, the center module 130, and the passenger module 140. These modules are generally located in certain positions within the vehicle. The driver module 120 is generally accessible by a driver of the vehicle, the center module 130 is centered in the vehicle and accessible by both a driver and a passenger, and the passenger module 140 is generally accessible by a passenger of the vehicle.

These modules, discussed in more detail herein, may communicate with one another via the smart back plane 210, enabling drivers and passengers to interact, when necessary, via the dashboard components. For example, the controls 125 on the driver module 120 may interface with the smart back panel to control or communicate with the display 135 of the center module and/or other systems in the vehicle.

As discussed herein, the dashboard assembly can be configured with selected modules to meet the needs of a mission variant performed by a tactical vehicle. Some examples of suitable vehicles include Joint Light Tactical Vehicles (JLTV). These vehicles can be configured to be infantry combat vehicles, command vehicles, reconnaissance vehicles, armored utility vehicles, and so on. Briefly, all JLTV vehicles share some similar capabilities and have some unique capabilities. They include a number of different payload categories.

A first category includes "Battlespace Awareness" vehicles, having payload capacities of approximately 3,500 lbs. These vehicles include the General Purpose Mobility (JLTV-A-GP) variant, which is designed as a general purpose utility vehicle having a 4-person capacity. A second category includes "Force Application" vehicles, having payload capacities of 4,000-4,500 lbs. These vehicles may be a number of different variants, including infantry carriers (JLTV-B-IC), reconnaissance vehicles, command and control vehicles, convoy escort vehicles, policing vehicles, weaponry vehicles, utility vehicles, ambulances and other medical vehicles, and so on.

A third category includes "Focused Logistics" vehicles, having payload capacities of approximately 5,100 lbs. These vehicles may also be a number of different variants, include shelter carrying vehicles, mover vehicles, other medical vehicles, and so on. Of course, other vehicle types may employ the modular dashboard assembly described herein and the dashboard assemblies can be configured and reconfigured with the modules best suited for the intended uses or missions of the vehicles.

Modular Dashboard Assembly

Figure 2A:
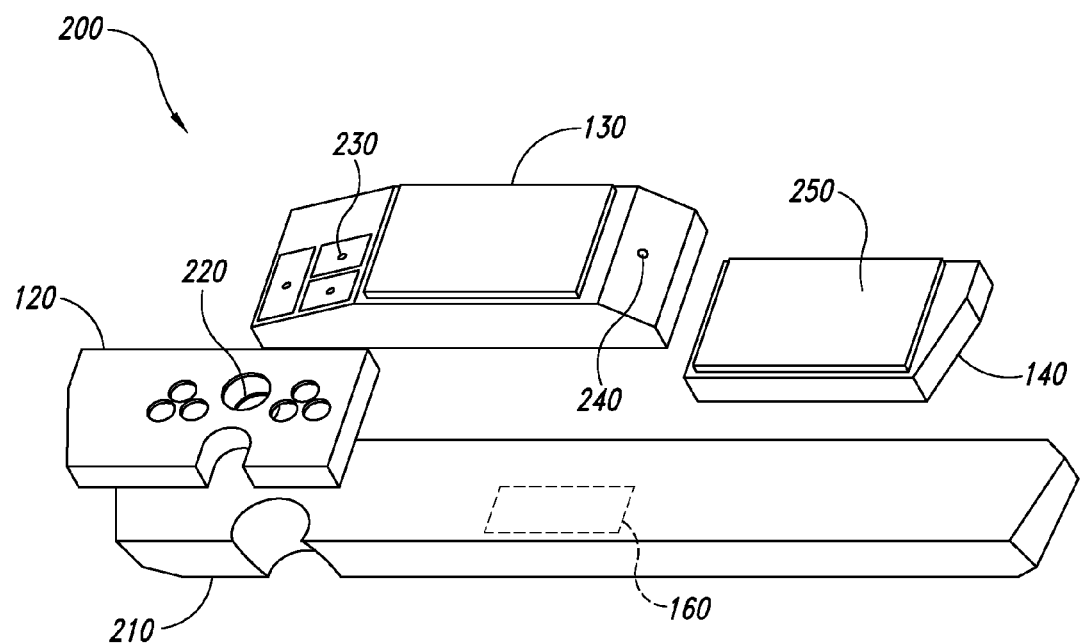
FIGS. 2A and 2B are a schematic, partially exploded isometric views of multi-piece modular dashboard assemblies in accordance with other embodiments.
Figure 2B:
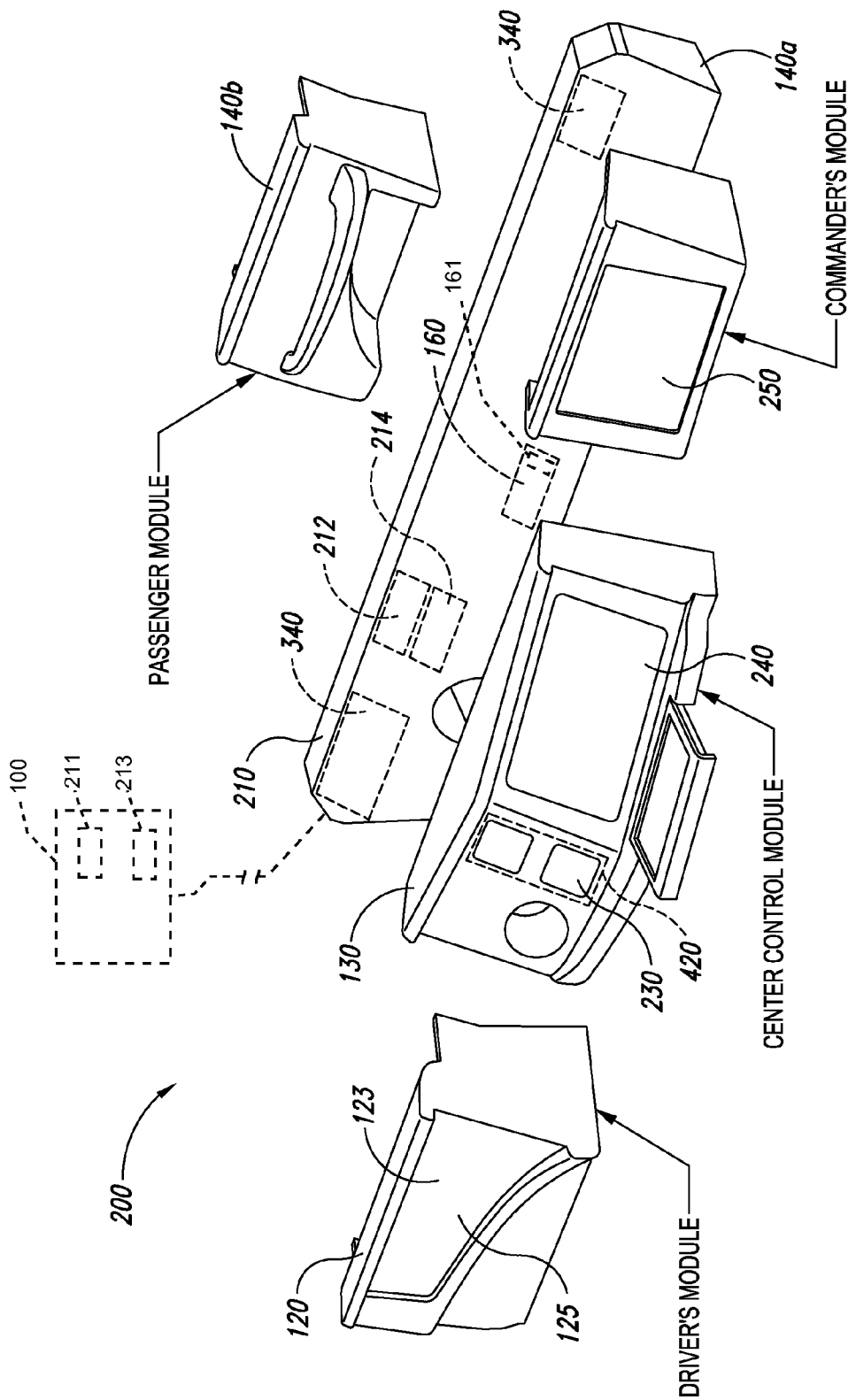
Figure 2C:
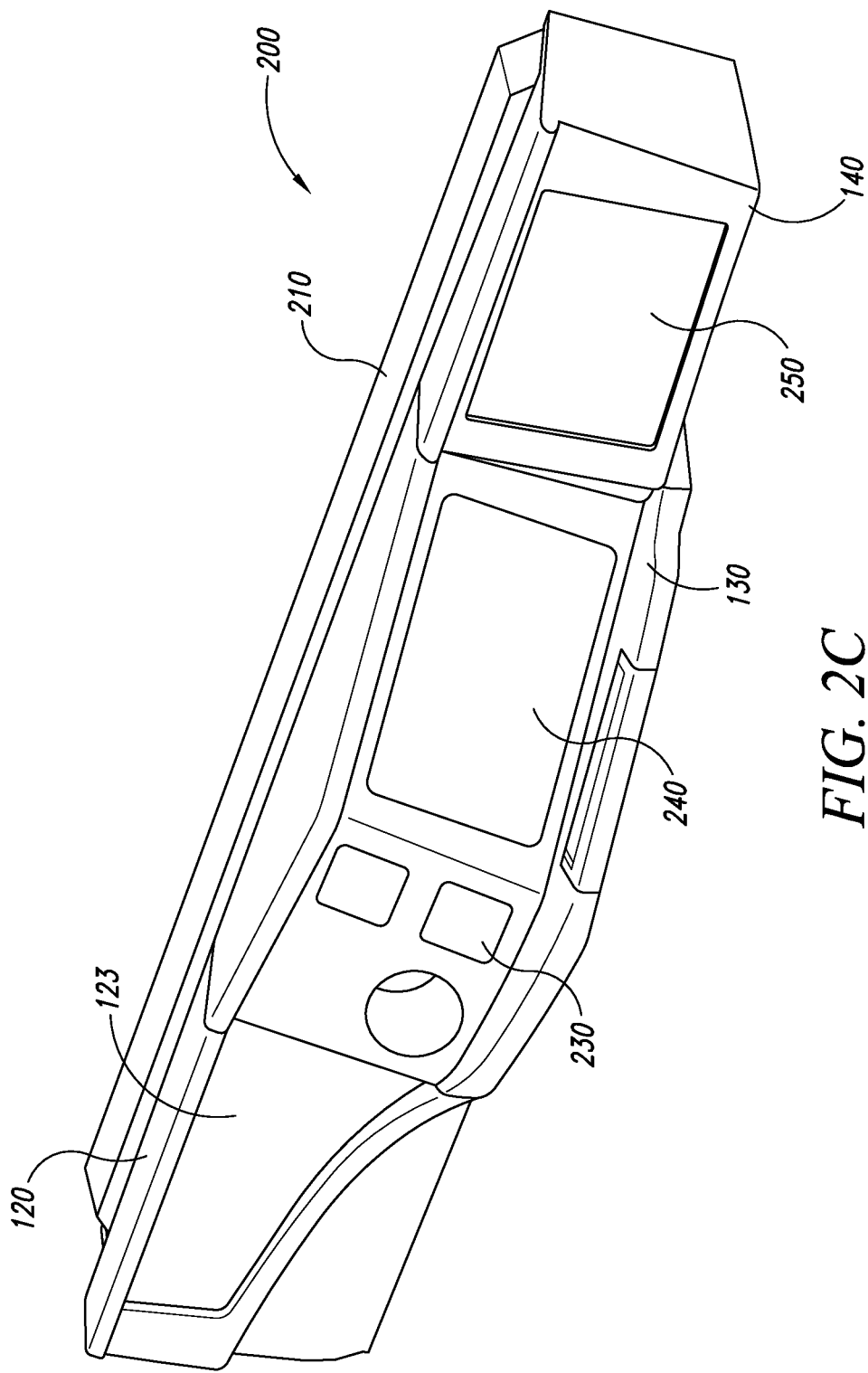
FIG. 2C is a schematic isometric view of a multi-piece modular dashboard assembly in accordance with another embodiment.

As discussed herein, some examples of the system employ a modular dashboard assembly useable in the tactical vehicle. Referring to FIGS. 2A, 2B and 2C are schematic, partially exploded isometric views of a four-piece modular dashboard assembly 200 is shown. The dashboard assembly 200 includes a back plane 210, and three front modules: a driver module 120, a center module 130, and a passenger module 140. The dashboard assembly 200 includes two or more module reception portions 340, wherein the module reception portions 340 are configured to receive a module containing one or more dashboard components 123, 125, provide an electrical communication link between the one or more dashboard components 123, 125 and a wiring harness 214, and provide a data communication link between the one or more dashboard components 123, 125 and a data bus 212.

In some examples, the back plane 210 is a smart back plane that includes the underlying electrical and data communications architecture for the dashboard assembly. In one embodiment, the smart back plane 210 includes a data bus 212 that provides data communication between the dashboard assembly 200 and the vehicle. The smart back plane 210 has an integral control system 160 that can be programmed and/or reprogrammed to control, monitor, and manage the modules 120, 130, and 140, the vehicle systems and components, and/or other mission-specific equipment carried by the vehicle. The back plane 210 is configured to connect to and/or interface with other systems in the vehicle, including the HVAC systems, drive systems, computer control systems, engine related systems, communication systems, etc. In one embodiment, the smart back plane 210 has a wiring harness 214 that provides electrical communication between the dashboard assembly 200 and the vehicle. The back plane 210 is also configured with the electronics and/or communication-related components that interface with each of the different front modules. FIGS. 2A, 2B, 2C, 3 and the following discussion provide a brief, general description of a suitable computing environment in which the system can be implemented. Although not required, aspects of the system are described in the general context of computer-executable instructions, such as routines executed by a general-purpose computing system within the backplane 210. Aspects of the system can be embodied in a special purpose computer or data processor that is specifically programmed, configured, or constructed to perform one or more of the computer-executable instructions explained in detail herein. Aspects of the system may be stored or distributed on computer-readable media, including magnetically or optically readable computer discs, hard-wired or preprogrammed chips (e.g., EEPROM semiconductor chips), nanotechnology memory, biological memory, or other data storage media.

The back plane 210 attaches the dashboard assembly to the vehicle, and can be fixedly secured to the vehicle. The front modules plug into or otherwise attach to the back plane. Thus, the combination of the fixed back panel with removable front modules provides for a secure, reliable dashboard easily reconfigurable to meet the operational or mission-specific needs of a vehicle.

In some examples, the smart back plane 210 with the integral control system 160 provides an electrical and/or communication link 161 between dashboard components contained in the various front modules and one or more controller area networks (CAN) or other control networks 211, of the vehicle. For example, the vehicle may have an engine control unit, a transmission control unit, braking control unit, and so on to control aspects of the vehicle. The vehicle can also be configured with other CANs to operatively connect to, as an example, mission-specific equipment or components 213 carried by the vehicle 100. The CAN facilitates communications between these and other control units, and controls actuators and receives information from sensors based on input from dashboard components. The system may employ other communication networks and protocols, such as the SAE J1939 protocol, the vehicle bus standard used for communication and diagnostics between vehicle components. The smart back plane interfaces with these vehicle components for the dashboard assembly 200.

In some examples, the back plane 210 with the integral control system 160 also contains or hosts data communication networks and channels not used in vehicle control and monitoring. For example, the back plane 210 may include DVI communications channels, USB communications channels, smart cards, and so on. Thus, the back plane 210 can facilitate the attachment and operation of C4I and other communication-based front modules within the modular dashboard assembly 200.

The back plane 210 can also be configured to interconnect the modules 120, 130 and 140 to other mission-specific equipment installed in or carried by the vehicle. For example, the back panel 210 can be configured to connect or interface with weapons control systems, fire control guidance systems, satellite based imaging systems, satellite radio systems, high-power communications or computing systems or other mission-specific equipment carried by the vehicle. The modules 120, 130 and 140 can plug into or otherwise connect to the back panel 210, thereby operatively connecting to the mission-specific equipment and to each other. The back panel 210 with the integral control system 160 can be configured to identify which modules 120, 130 and 140 (and their associated functionality) are mounted on the back panel. The back panel 210 can be also be configured to monitor the health of the modules 120, 130 and 140 and/or systems in or carried by the vehicle.

In one embodiment, the mission-specific components are coupled to and controlled by the back panel's integral control system 160 for communication with the modules 120, 130 and 140. This arrangement can facilitate the sensor fusion between the components in or carried by the vehicle, such as the mission-specific components configured to work together in direct or complimentary fashions. In other embodiments, the back panel 210 can include one or more independent connectors (i.e, not routed through to the back panel's integral control system 160) to allow for direct interconnection between a mission-specific component and a selected modules 120, 130 or 140. These independent connectors are positioned on the back panel 210 so as to allow mating connectors on a modules 120, 130 or 140 to plug into and/or connect with the mission-specific component. In another embodiment, the back panel 210 can include one or more apertures or pass-through portions that allow power, electrical, and/or communication lines in the vehicle to pass through the back panel. These pass through portions can be positioned to accommodate and of the vehicle's existing or fixed wiring and cable systems as needed.

As discussed herein, the front modules may provide various dashboard components, depending on the needs of the system, vehicle, and/or mission. A driver module 120 may include user interface components 230, such as gauges, displays, vehicle toggles, switches, and controls, and so on. That is, the driver module 120 may include input components that receive input from a user (such as a driver) to control the performance or functionality of the vehicle, as well as output components that provide information to the driver associated with the functionality or performance of the vehicle.

A center module 130 may extend the driver module 120, or may include additional dashboard components. For example, the center module 130 may include additional switches and controls 230 as well as display components 240, such as displays that provide multimedia information to the driver.

A passenger module 140 may include modules dependent on a mission variant of the vehicle. For example, the passenger module 140 may include a display component 250 that acts to receive input and output information via a touch screen or associated keyboard. In some cases, the passenger module includes C4I (command, control, communications, computers, and intelligence) equipment. These components may provide mission-based and/or situation-based information to a passenger of the vehicle. Example components include displays, computing systems, weapon systems, monitoring systems, storage systems, navigation systems, and communication systems.

The front modules 120, 130, and 140 may be releasably attached to the back plane 210 using a number of different attachment mechanisms. In some cases, the front modules are removable attached to the back plane using quick-release attachment mechanisms. That is, the front modules are secured in the back plane, but can be easily and quickly removed by releasing the quick-release mechanisms should the need arise. The back plane 210 may include reception ports configured to receive the front modules. The reception ports may be configured to receive all front modules, a selected number of front modules, or a single module. For example, in some cases a reception port on the back plane located on a passenger portion of the vehicle may be configured to receive a number of different passenger modules 140*a* and 140*b* (FIGS. 2A and 2B), but not driver or center modules. In other cases, the reception port may be configured to receive all types of front modules so that the front modules are interchangeable in the different reception ports. For example, it may be necessary to swap the center and passenger modules with each other. Having reception ports configured to receive different types of front modules facilitates such a reconfiguration requirement.

Figure 3:
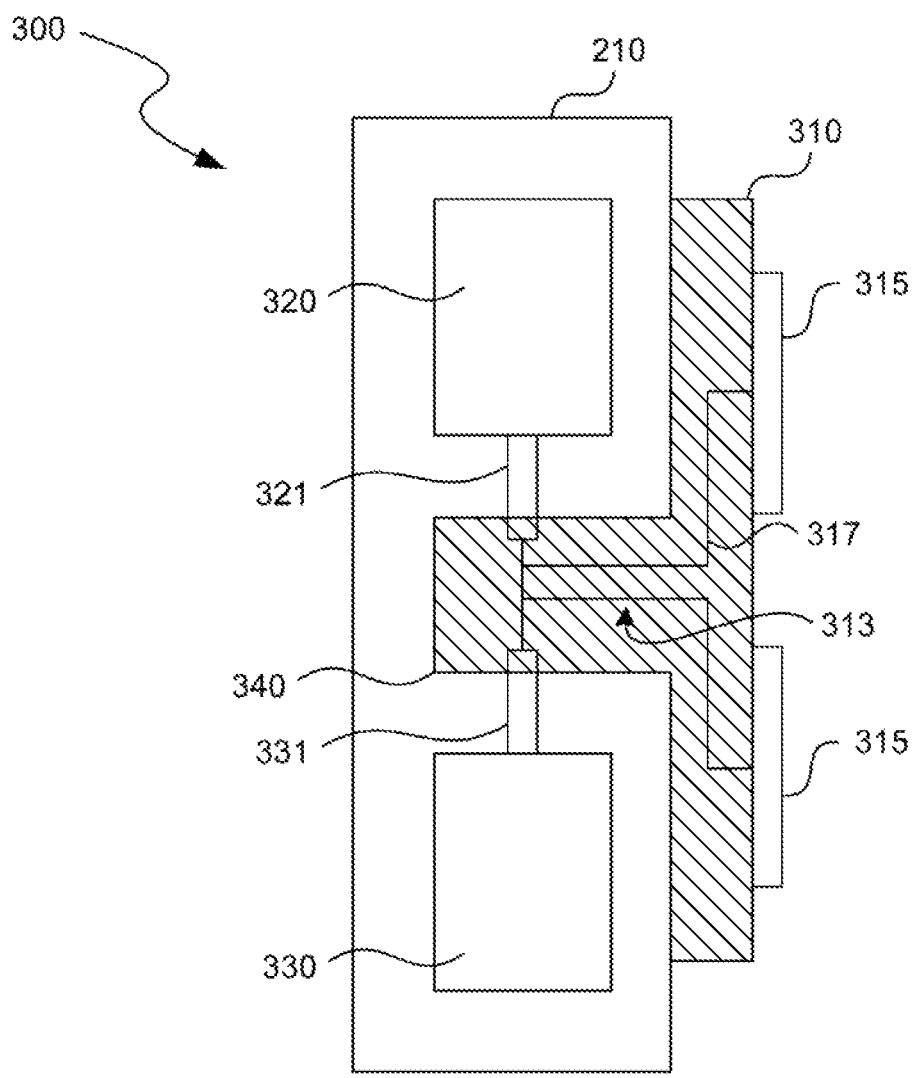
FIG. 3 is a block diagram illustrating a module attached to a smart back-panel in a modular dashboard assembly in accordance with an embodiment.

In some examples, the back plane 210, via reception ports, facilitates electrical and data communications between dashboard components and a vehicle control network or other equipment or components carried by the vehicle as discussed above. Referring to FIG. 3, a block diagram 300 illustrating a front module 310 attached to a back plane 210 in a modular dashboard is shown. The back plane 210 includes vehicle network communication equipment 320 and dashboard communication systems equipment 330. The back plane 210 also includes a reception portion 340 configured to receive a front module 310, such as a via an attachment portion 313 of the front module 310. The back plane 210 may provide wiring or other electrical connections 321, 331 that connect the communication equipment 320, 330, respectively, to the front module 310. The front module 310 may also include electrical connections 317 that connect dashboard components 313 to the electrical and communications equipment within the back module 110. Thus, the back plane 210 facilitates communications between dashboard components, the vehicle network, and other mission-specific components mounted in the vehicle. In addition, the back panel 210 facilitates communications between the components or features on the dashboard components or in the modules 120, 130 and 140.

The dashboard system contains much of the underlying communications, HVAC, and electrical interface architecture within the back plane in order to facilitate the attachment of front modules (and, indirectly, dashboard components) and the interface with the other vehicle systems from the dashboard assembly. In some examples, the back plane acts as a structural backbone of the dashboard assembly. Therefore, the dashboard system may locate electrical wiring, HVAC assemblies, communications assemblies, and so on within the back plane without hindering the interchangeable capabilities of the dashboard assembly, because the placement, size, and configuration of the front modules is standardized.

The front modules may be sealed during or after attachment to the back plane. The dashboard system may seal the modules (and interfaces between the modules) using a number of different techniques and processes, and should provide protection from NBC (nuclear, biological, chemical) washing, high pressure hose washing, immersion, and pressurization of the vehicle.

Figure 4:
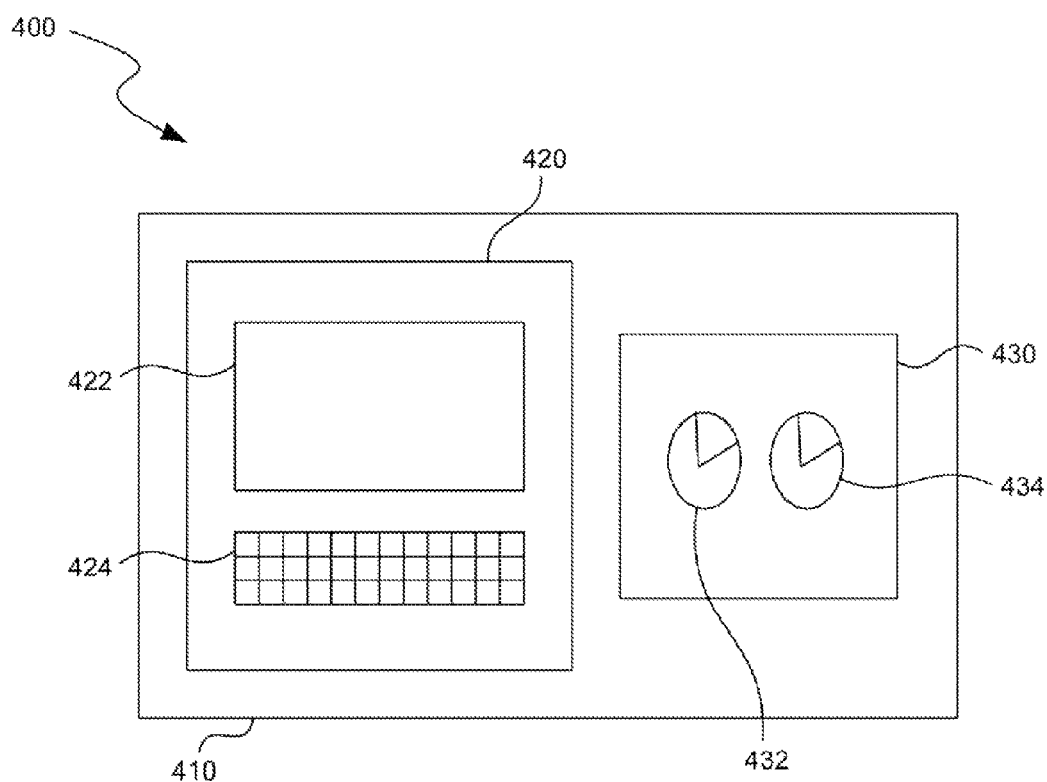
FIG. 4 is a block diagram illustrating an interchangeable module of the modular dashboard assembly with sub-modules removeably attached to the module.

In addition to containing discrete dashboard components, one or more of the front modules in accordance with other embodiments may also contain sub-modules removeably and/or interchangeably mounted on a selected front module. Referring to FIG. 4, a block diagram illustrating a modular dashboard assembly 400 with front modules mounted to a smart back plane, and a least one of the front modules (driver, center, or passenger module) includes sub-modules within the front module is shown. In the illustrated embodiment, the dashboard assembly 400 includes a front module 410 containing two sub-modules, such as sub-module 420 and sub-module 430. Sub-module 420 includes a display component 422 and an input component 424, and sub-module 430 includes two different interface, display or communication components 432 and 434. Thus, in some examples, the system adapts the front modules to include sub-modules, providing additional adaptability and scalability, among other benefits, when a vehicle is configured to a mission's requirements.

For example, a vehicle can be used in a reconnaissance mission, with the front module 400 containing a communications sub-module 420 and an interface sub-module 430 supported by a support portion 440 of the first module. Once the mission is completed, the vehicle may be assigned to a patrol mission, wherein the vehicle does not require the communications sub-module, but requires other mission-specific components, such as gauges, navigational features, etc. The communications sub-module 420 can be easily and quickly, removed, and another sub-module is plugged into or otherwise attached to the respective front module. Thus, instead of removing the entire front module, only the sub-module unnecessary for the mission is removed and replaced. Thus, the modular dashboard system can provide a deeper level of granularity in how the modular dashboard can be reconfigured.

Figure 5:
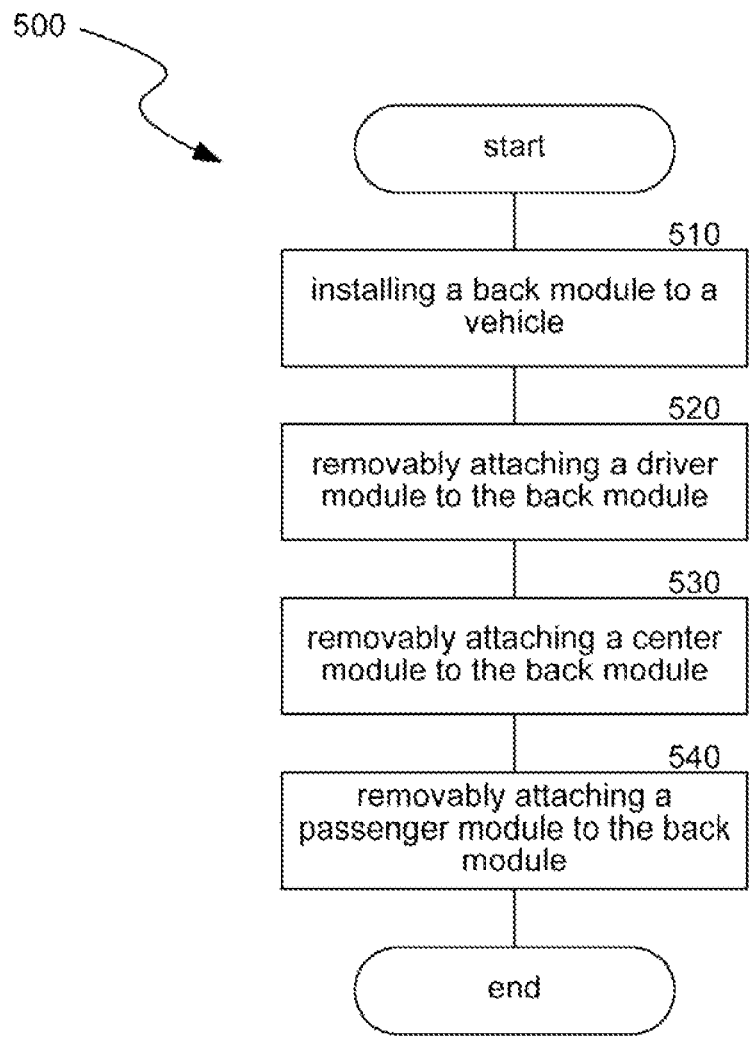
FIG. 5 is a flow diagram illustrating a routine for assembling a modular dashboard assembly within a vehicle.

As discussed herein, the modular dashboard assembly includes a smart back plane and a number of different front modules. Referring to FIG. 5, a flow diagram illustrating a routine 500 for manufacturing a modular dashboard assembly within a vehicle is shown. In step 510, a smart back panel is installed into a vehicle. During installation, electrical, data, HVAC and other interface components within the back plane is connected to the various complementary networks and/or systems of the vehicle, as described herein. The back plane may be removable attached, or may be fixedly attached to the vehicle, depending of the configuration of the vehicle. In some embodiments, the back plane can be modular or segmented, and the back plane segments are attached individually to the vehicle structures. For example, a first back plane segment, which includes an electrical bus is first installed, followed by a second back plane segment that includes a data bus. Of course, other installations or attachments of the back segments are possible in other embodiments.

In step 520, a driver module is removably attached to the back plane. As described herein, the driver module (and other described modules) may include an attachment portion configured to attach to a reception component of the back module. The driver module may be selected from a number of different driver modules, depending on requirements of the mission, the needs of the driver, and so on. In step 530, a center module is removably attached to the back plane. The center module may be selected from a number of different modules, depending on the requirements of the mission, the needs of the occupants, and so on. In step 540, the passenger module is removably attached to the back plane. The passenger module may be selected from a number of different modules, depending on the mission, the needs of the passenger, and so on. In general, each type of module is removably attached at one specific location (e.g., the center module is removably attached to a center portion of the back module). However, in some cases the front modules may be attached at different locations. For example, a mission may require two different passenger modules, and the system may facilitate attaching one of the passenger modules in place of a center module.

Communications Via the Dashboard Assembly

Figure 6:
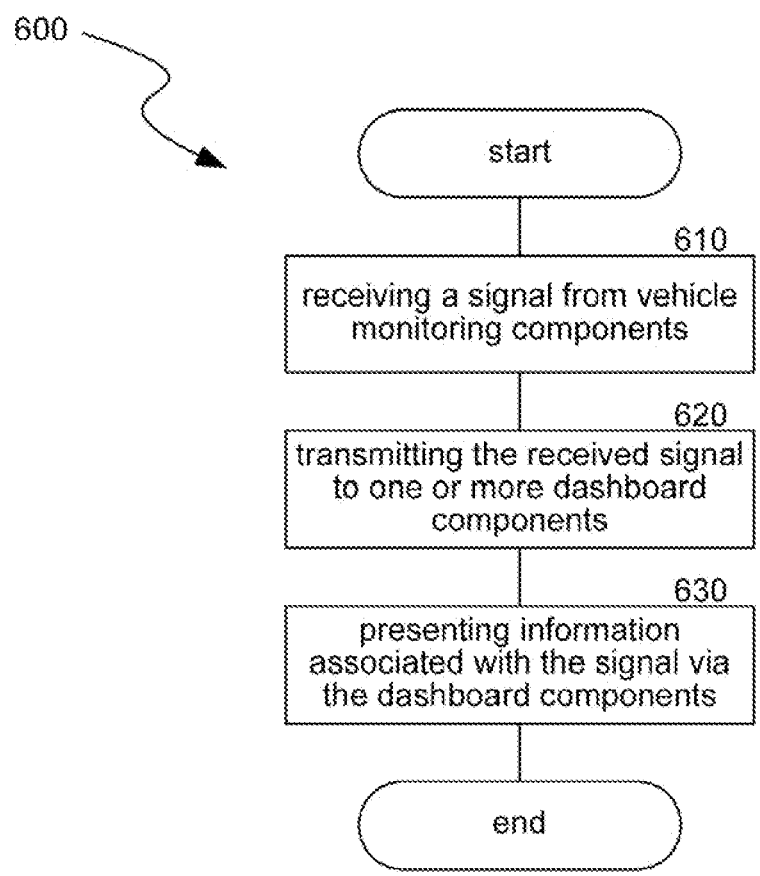
FIG. 6 is flow diagram illustrating a routine for providing information to a user via a modular dashboard assembly.

As described herein, the back plane 210 provides an electrical and/or communications link between a vehicle network (such as a CAN) and dashboard components on a modular dashboard assembly 200. In some examples, the back plane facilitates the display of information about a vehicle to a user. Referring to FIG. 6, a flow diagram illustrating a routine 600 for providing information to a user via a modular dashboard assembly is shown. In step 610, the back plane receives a signal from a vehicle monitoring component, such as a sensor within a control network. In step 620, the back plane transmits the signal, or information associated with the signal, to a dashboard component, such as a dashboard component associated with the sensor. The back plane may condition the signal or generate a different signal or command based on the front module and associated dashboard components attached to the back plane. In step 630, the dashboard component presents the information from the sensor to a user of the vehicle. Thus, the back plane provides a link between a control network in a vehicle with various dashboard components, enabling the system to provide different modules (and, therefore, different dashboard components), without requiring direct connections between the dashboard components and systems within the vehicle.

Figure 7:
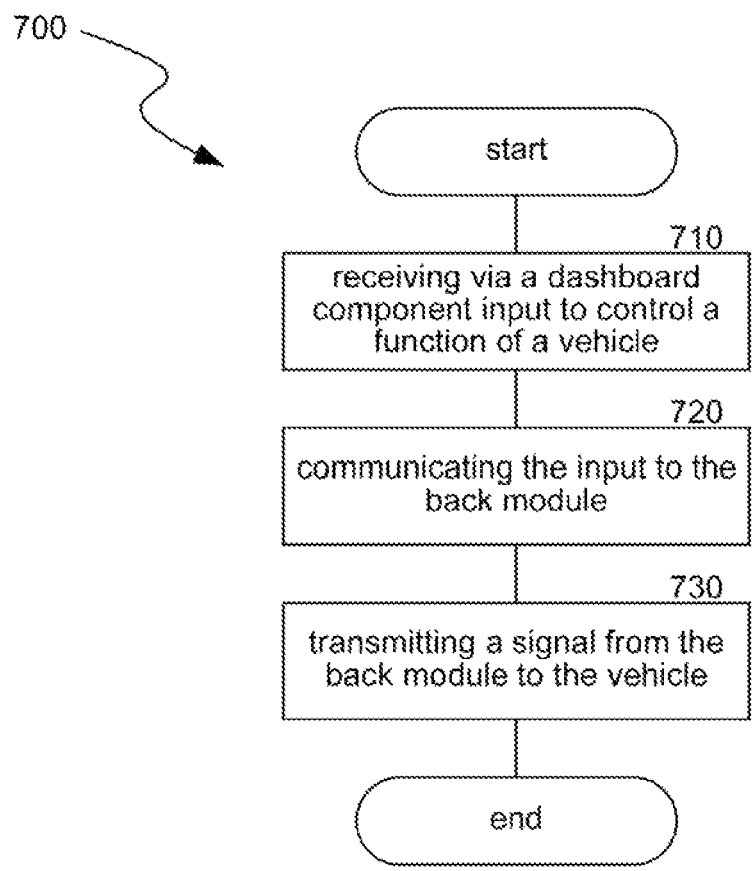
FIG. 7 is a flow diagram illustrating a routine for controlling a vehicle via a modular dashboard assembly.

In some examples, the back plane facilitates user control of the vehicle using dashboard components. Referring to FIG. 7, a flow diagram illustrating a routine 700 for controlling a vehicle via a modular dashboard assembly is shown. In step 710, user input is received via a dashboard component, such as a control component. For example, the system may a selection to adjust the braking force of the vehicle. In step 720, the front module that contains the control components communicates the input to the back plane. In step 730, the back plane transmits a signal based on the received input. For example, the back plane directs a signal to an actuator associated with the braking control unit of the vehicle. Again, the back plane provides indirect connections between front modules containing dashboard components with vehicle network components, which facilitates easy reconfiguration of the front modules, because they are not directly connected to the vehicle.

Figure 8:
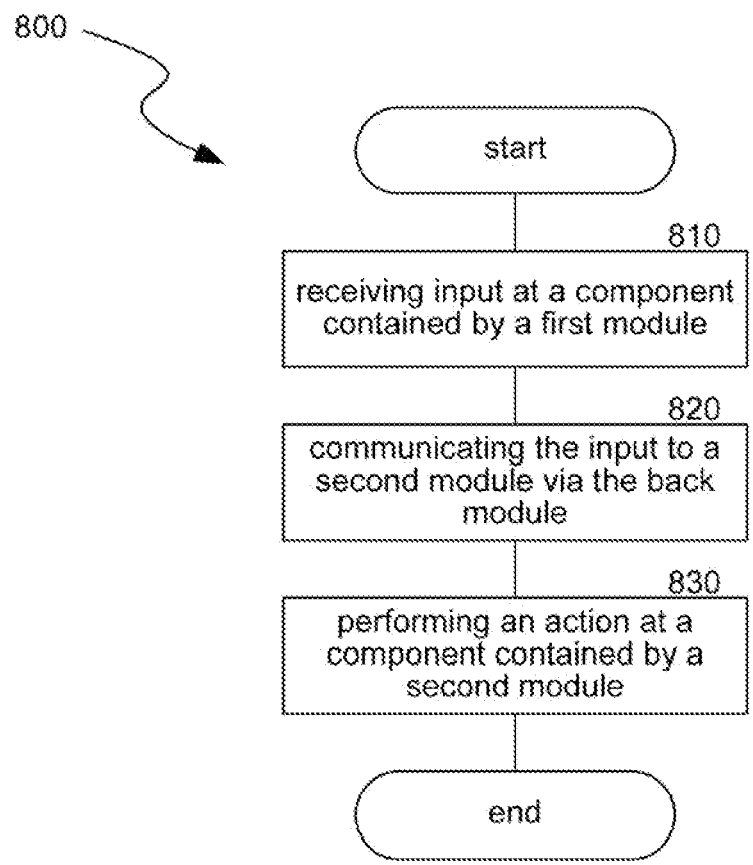
FIG. 8 is a flow diagram illustrating a routine for controlling a component at one module with a component at another module.

In some examples, the modular dashboard assembly, via the back plane, provides for communications between modules. Referring to FIG. 8, a flow diagram illustrating a routine 800 for controlling a component at one module with a component at another module is shown. In step 810, the dashboard assembly receives input at a dashboard component within a first module. For example, the driver pushes a button to turn on a display component within a passenger module. In step 820, the dashboard assembly directs the input (or, information, data, or electrical signals associated with the input) to a second module via the back plane. For example, the input generates a signal that moves through an electrical bus within the back plane to the passenger module. The back plane may direct the signal to the appropriate module according to known techniques. In step 830, a dashboard component within the second module performs an action based on the received input at the first module. For example, the display component within the passenger module displays a map as directed by the input.

Figure 9:
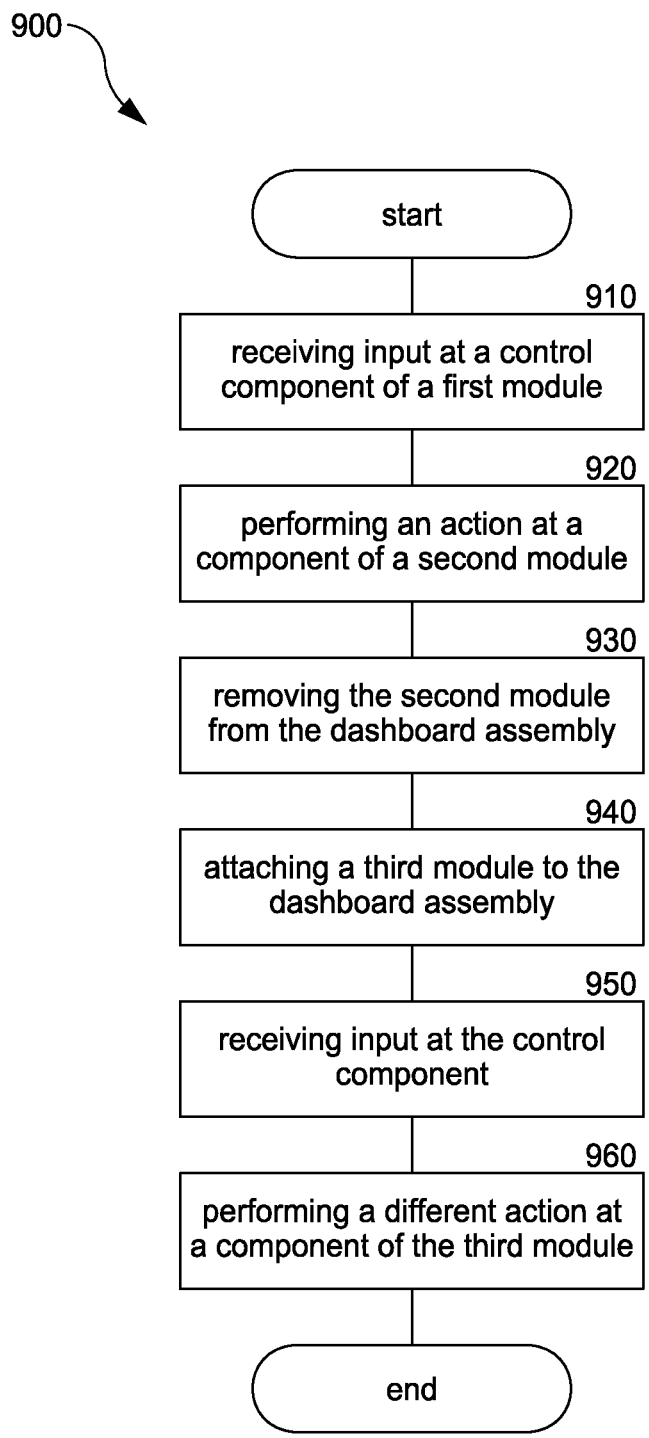
FIG. 9 is a flow diagram illustrating a routine for performing actions via a dashboard assembly.

Because the front modules are interchangeable, the system may facilitate the reassignment of control components to other components depending on the configuration of the dashboard assembly. Referring to FIG. 9, a flow diagram illustrating a routine 900 for performing actions via a dashboard assembly is shown. In step 910, the dashboard assembly receives input via a control component within a first module. For example, during a first mission, the driver turns a dial within the driver module. In step 920, the dashboard assembly performs an action at a component within a second module. For example, a display within the passenger module provides a wide view of an area in front of the driver.

In step 930, the second module is removed from the dashboard assembly. For example, the vehicle may have completed the first mission, and is awaiting deployment to another mission. In step 940, a third module is removably attached to the dashboard assembly. For example, the new mission requires additional communication components, and a new module that includes satellite radio is removable attached to the dashboard assembly.

In step 950, the dashboard assembly receives input via the control component at the first module. For example, the driver turns the same dial. In step 960, the dashboard assembly performs a different action at a component within the third module. For example, the radio tunes to a selected channel.

Thus, in some cases the modular dashboard assembly, via a back plane facilitates the control of different dashboard components without direct connections between the components. This enables the easy reconfiguration of the dashboard assembly, among other things. Additionally, the modular dashboard assembly can assign certain control and other dashboard components many different functions by replacing one front module with another.

CONCLUSION

Thus, the modular dashboard assembly described herein provides flexibility in manufacturing and developing vehicles for deployment into mission variants. The interchangeability may reduce costs and effort in configuring vehicles for certain uses. In addition, the modular dashboard assembly may be implemented into other vehicles, such as commercial vehicles, passenger vehicles, automobiles, and so on. The modularity may enable vehicle dealers to provide different styles and functions for the interiors of their vehicles, which can be attractive to potential buyers, without incurring the additional costs associated with supplying different vehicles.

From the foregoing, it will be appreciated that specific examples of the system have been described herein for purposes of illustration, but that various modifications may be made without deviating from the spirit and scope of the system. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as a method of manufacturing, other aspects may likewise be recited as a method of manufacturing. Accordingly, the inventors reserve the right to add additional claims after filing the application to pursue such additional claim forms for other aspects of the system.

We claim:

1. A modular dashboard system for use in a tactical vehicle containing a control network and being configured for use in a selected mission, the vehicle having a mission component for use in connection with the selected mission, the vehicle having a dashboard assembly with a back plane having a communications link that communicates with a control network within the vehicle and is coupled to the mission component, the system comprising: a first dashboard module removably attachable to a first receiving portion of the back plane and connectable to the communications link, and a second dashboard module removably attachable to a second receiving portion of the back place spaced apart from the first dashboard module, wherein the first dashboard module includes two or more dashboard components associated with components within the control network of the vehicle, wherein the first dashboard module includes a first dashboard component that communicates with the components within the control network of the vehicle via the communications link, and the first dashboard component operatively couples to the mission component of the vehicle via the back plane.

2. The modular dashboard system of claim 1 wherein at least one of the two or more dashboard components displays information via data received from the communications link.

3. The modular dashboard system of claim 1 wherein the second dashboard module has at least one dashboard component associated with a functionality related to the selected mission.

4. The modular dashboard system of claim 1 wherein at least one of the first and second dashboard modules includes a display component.

5. The modular dashboard system of claim 1 wherein at least one of the first and second dashboard modules includes at least a portion of a communications system.

6. The modular dashboard system of claim 1 wherein at least one of the first and second dashboard modules includes a storage component.

7. The modular dashboard system of claim 1, further comprising a third dashboard module removably attachable to the back plane and connectable to the communication link, the third dashboard module having a display configured to display information received from the control network of the tactical vehicle.

8. The modular dashboard system of claim 1 wherein the first dashboard component of the first dashboard module is useable in connection with the selected mission, and the second dashboard module has a second dashboard component in communication with the first dashboard component via the back plane.

9. The modular dashboard system of claim 1, further comprising a third dashboard module that has functionality different than the first dashboard module and wherein the third dashboard module is interchangeable on the back plane with the first dashboard module.

10. The modular dashboard system of claim 1, further comprising a third dashboard module that has functionality different than the first dashboard module and wherein the third dashboard module is interchangeable on the back plane with the second dashboard module.

11. The modular dashboard system of claim 1 wherein the first dashboard module is a driver module configured for use by a driver of the vehicle, and the second dashboard module is a passenger module configured for use by a passenger in the vehicle.

12. The modular dashboard system of claim 11, further comprising a third dashboard module removably attachable to the back plane between the first and second dashboard modules.

13. A modular dashboard system for use in a tactical vehicle containing a control network and being configured for use in a selected mission, the vehicle having a mission component for use in connection with the selected mission, the vehicle having a dashboard assembly with a back plane having a communications link that communicates with a control network within the vehicle and is coupled to the mission component, the system comprising: a first dashboard module removably attachable to a first receiving portion of the back plane and connectable to the communications link, wherein the first dashboard module includes two or more dashboard components associated with components within the control network of the vehicle, wherein the first dashboard module includes a first dashboard component that communicates with the components within the control network of the vehicle via the communications link, and the first dashboard component operatively couples to the mission component of the vehicle via the back plane.

14. The modular dashboard system of claim 13 wherein at least one of the two or more dashboard components displays information via data received from the communications link.

15. The modular dashboard system of claim 13 wherein the first dashboard module includes a display component.

16. The modular dashboard system of claim 13 wherein the first dashboard module includes at least a portion of a communications system.

17. The modular dashboard system of claim 13 wherein the first dashboard module is a driver module configured for use by a driver of the vehicle.

18. The modular dashboard system of claim 13 wherein the first dashboard module is a passenger module configured for use by a passenger in the vehicle.

19. The modular dashboard system of claim 13, further comprising a second dashboard module that has a functionality different than the first dashboard module and wherein the second dashboard module is interchangeable on the back plane with the first dashboard module.

* * * * *